United States Patent [19]
Gerber

[11] Patent Number: 5,033,343
[45] Date of Patent: Jul. 23, 1991

[54] VARIABLE LOWERING STOP FOR CUTTER KNIFE

[75] Inventor: Heinz J. Gerber, West Hartford, Conn.

[73] Assignee: Gerber Garment Technology, Inc., Tolland, Conn.

[21] Appl. No.: 478,344

[22] Filed: Feb. 12, 1990

[51] Int. Cl.⁵ ...................... B23Q 15/28; B26D 7/12
[52] U.S. Cl. .......................................... 83/74; 83/174; 83/529
[58] Field of Search ................ 83/527, 529, 530, 941, 83/955, 368, 174, 174.1, 936, 937, 938, 939, 940, 528, 427, 74, 72, 522.27, 75

[56]  References Cited
U.S. PATENT DOCUMENTS

| 3,121,364 | 2/1964 | Castle, Jr. | 83/529 |
| 3,183,756 | 5/1965 | Dehn | 83/530 |
| 3,318,235 | 5/1967 | Hanni | 83/529 |
| 3,541,906 | 11/1970 | Sederberg et al. | 83/174 X |
| 4,133,233 | 1/1979 | Pearl | 83/174 X |
| 4,841,822 | 6/1989 | Gerber | 83/174 |

Primary Examiner—Douglas D. Watts
Assistant Examiner—Kenneth E. Peterson
Attorney, Agent, or Firm—McCormick, Paulding & Huber

[57] ABSTRACT

A cutter head having a reciprocating knife has a base frame movable relative to a support carriage between a raised non-cutting position and a lowered cutting position with the base frame and the support carriage cooperating with one another to limit the movement of the base frame to define raised and lowered positions. A variable lowering stop mechanism is interposed between said base frame and said carriage to adjustably lower the cutting depth of the knife relative to said support carriage in response to a decrease in knife length at its tip resulting from sharpening. The variable lowering stop mechanism may be activated by a controller which counts the number of sharpenings occurring during a cutting operation.

17 Claims, 6 Drawing Sheets

VARIABLE LOWERING STOP FOR CUTTER KNIFE

BACKGROUND OF THE INVENTION

This invention relates to an apparatus for cutting cloth and other similar sheet material spread over a knife penetrable bed defining a support surface, and deals more particularly with an improvement in such an apparatus wherein means are provided for adjusting the lower limit of travel of the reciprocating knife of a cutter head in response to shortening of the knife at its tip occurring as a result of its being sharpened, so that during cutting operations the knife is maintained at an optimum bed penetration depth throughout its service life.

In known machines for cutting sheet material spread on a supporting surface, the lower end of a knife plunges into a bed providing the supporting surface while it is reciprocated and moved forwardly during a cutting operation to cut sheet material on the surface. One such machine is disclosed in U.S. Pat. No. 4,841,822 issued on June 27, 1989. In the machine of this patent, a cutter head including a knife moves between raised and lowered positions relative to a support carriage and relative to the material supporting surface. When the cutter head is in its raised position, the knife is held entirely above the material in a non-cutting condition, and when the cutter head is moved from its raised to its lowered position the lower end of the knife is plunged through the material and into the bed where it remains during a cutting operation.

In such previously known machines, the lowered position of the cutter head has been fixed relative to the support carriage and to the material supporting surface. This has the disadvantage that as the knife becomes shortened due to repeated sharpenings the lower end of the knife may eventually not penetrate the material supporting bed to the extent desired for proper cutting.

Accordingly, it is an object of the present invention to provide in a cloth cutting machine or the like an adjustable limit stop for the knife providing cutter head to vary the lowermost limit of travel of the cutter head so that the lower end of the knife may be maintained properly within the associated knife penetrable material supporting bed regardless of shortening of the knife by repeated sharpening.

It is yet another object of the present invention to provide a variable limit stop of the foregoing character operating with a controller to adjust the lowermost limit of travel of the cutter head relative to the bed in accordance with the number of sharpening operations executed on the knife.

Other objects and advantages of the invention will be apparent from the following description and drawings and from the appended claims.

SUMMARY OF THE INVENTION

The invention resides in a variable limit stop employed in a cloth cutting machine or the like having a reciprocating knife, which stop defines the depth to which the knife penetrates an associated material supporting bed during a cutting operation. The machine has a knife carrying cutter head with a base frame supported for vertical movement between a raised position and a lowered position relative to a support, such as a supporting carriage movable in X and Y coordinate directions in a plane parallel to the material supporting surface provided by the bed. The variable limit stop includes a stop mechanism carried by either the cutter head base frame or the support for engagement with a bumper fixed to the other of the base frame and support to define the lowered position of the base frame.

The stop mechanism has at least two stop surfaces or surface portions each having a different vertical level relative to the base frame or support which carries it and selectively positionable for engagement by the bumper to limit the downward movement of the base frame.

The invention further resides in means for automatically adjusting the stop mechanism to change the stop surface or surface portion cooperating with the bumper in response to shortening of the knife as by counting knife sharpenings.

DETAILED DESCRIPTION OF THE PREFERRED EMBODIMENTS

Figure 1:
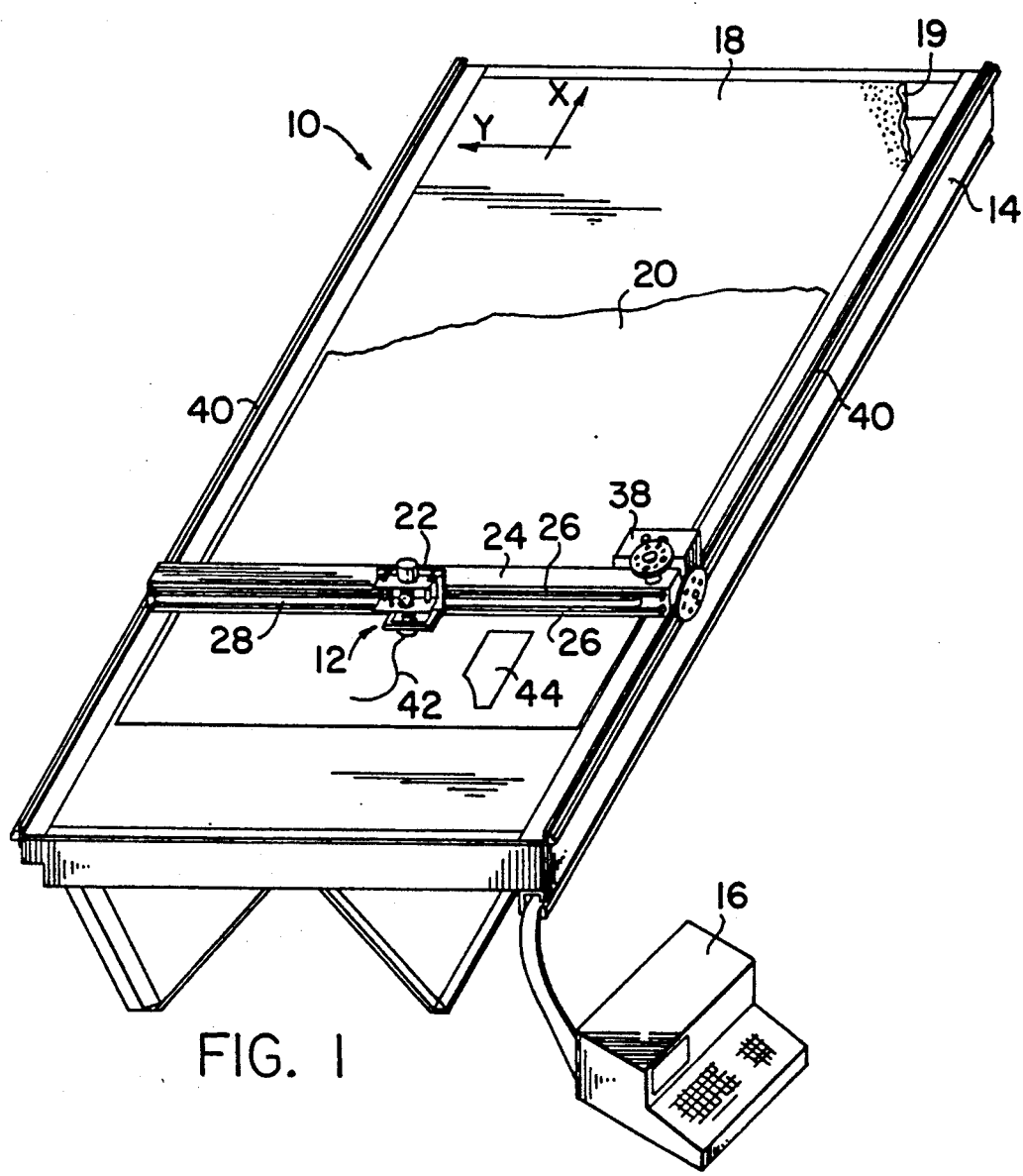
FIG. 1 is a perspective view showing a cloth cutting machine embodying the present invention.

FIG. 1 shows a cloth cutting machine 10 embracing the invention and having a cutter head 12. In addition to the cutter head 12, the machine includes a cutting table 14 and a computerized controller 16 for directing the movements of the cutter head relative to the cutting table 14. The table 14 may be one such as disclosed in U.S. Pat. No. 4,587,873, issued on May 13, 1986 in the name of the same inventor as this application, which includes an associated vacuum system for holding in place and compacting the material laid upon it to be cut. Such vacuum system is not however a critical point of the present invention and has therefore been omitted in the accompanying drawings and description for clarity.

The table 14 has an elongated rectangular horizontal and upwardly facing surface 18 for supporting the material to be cut in a spread condition. A sheet of such material is shown at 20. The illustrated machine 10 is a low cost, light weight high speed machine particularly adapted to the cutting of a single layer of sheet material spread on its supporting surface 18, to the cutting of a single web of sheet material which is folded upon itself to create two layers (such cutting being referred to as "cutting on the fold") or to the cutting of low height layups consisting of a relatively small number of layers of superimposed sheet material. However, the invention is not necessarily limited to use with such a cutting machine and may be incorporated into machines for cutting layups of any height or number of layers.

The material providing the work surface 18 of the table 14 may vary widely, but in any event it is in the form of a knife penetrable bed 19. Preferably, the bed consists of a plurality of bristle elements or blocks fitted together, as in the aforementioned U.S. Pat. No. 4,587,873, with the bristles extending vertically and being substantially longer than the vertical stroke of the knife so that the lower end of the knife can remain constantly within the bristle bed throughout the full extent of each of its strokes during a cutting operation.

The cutter head 12 is carried for movement in the illustrated Y coordinate direction above the table 14 on a support carriage 22 by two guide bars 26,26 forming part of an X carriage 24 movable in the illustrated X coordinate direction. Movement of the tool carriage 22 in the illustrated Y coordinate direction is effected by a drive belt 28 fastened to the tool carriage 22 and passing over pulleys at opposite ends of the carriage 24, one of which pulleys is powered by a motor containing service module 38 attached to the carriage 24, the motor in turn being controlled by the numerical controller 16. At each of its opposite ends the X-carriage 24 is guided for movement relative to the table 14 by a rack and rail guide 40 extending along the associated side edge of the table, the carriage 24 having pinions (not shown) at its opposite ends engaging the racks and powered by another motor in the service module 38 controlled by the controller 16.

By combined movement of the X-carriage 24 in the X coordinate direction and the tool carriage 22 in the Y coordinate direction the cutter head 12 may be made to follow any desired line of cut on the sheet 20 to cut pattern parts or other similar components from it. One of such line of cut is indicated at 42 and one such pattern piece is indicated at 44.

Figure 2:
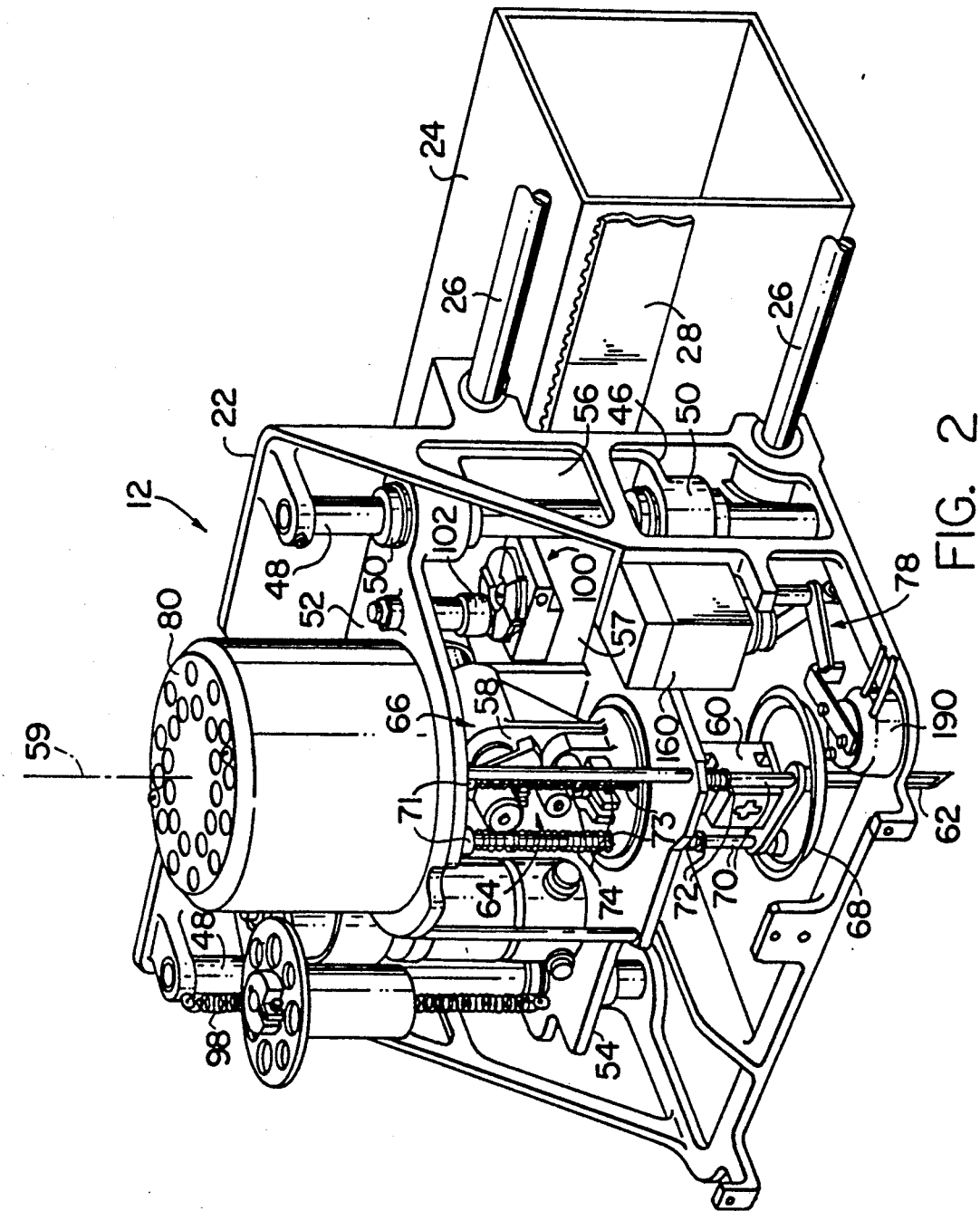
FIG. 2 is a perspective view of the cutter head of the machine of FIG. 1, the base frame of the cutter head being shown in its position and in engagement with the variable lowering stop.
Figure 3:
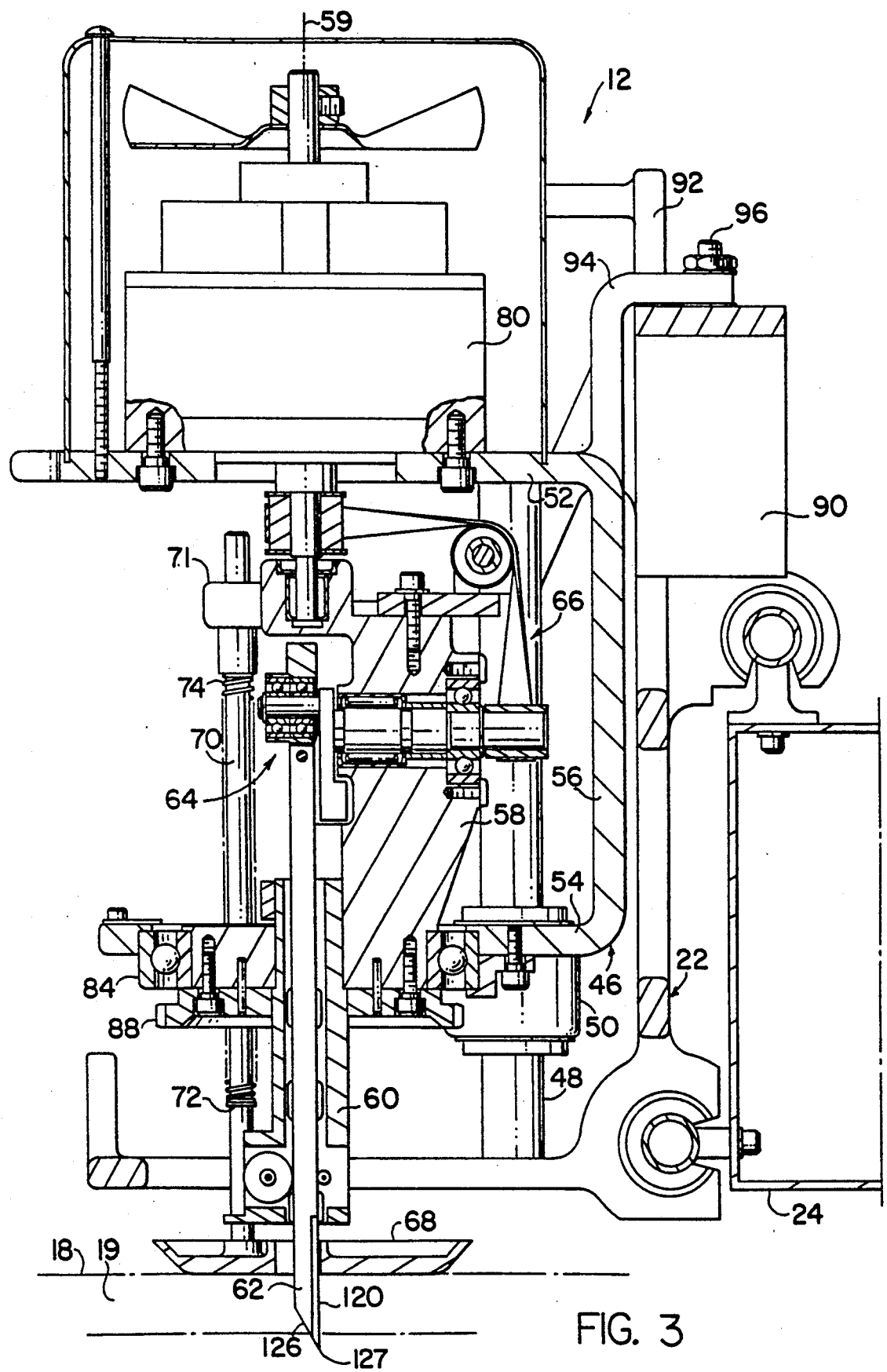
FIG. 3 is a partially fragmentary vertical sectional view taken along the line 3—3 in FIG. 6.

Turning now to FIGS. 2 and 3, the general construction of the cutter head 12 is there shown. It includes a base frame 46 supported for vertical movement relative to the support carriage 22 by two vertical guide rods 48,48 fixed to the support carriage and by slide bearings 50,50 fixed to the base frame and slidably receiving the rods 48,48. As will be discussed in greater detail later, the base frame 46 is moved between a non-cutting raised position and a lowered cutting position relative to the tool carriage 22 by a pneumatic actuator or similar motor. The base frame 46 is a generally U-shaped member having an upper horizontal wall 52 and a lower horizontal wall 54 connected with one another by vertically extending wall sections 56,56. The three wall sections 56 are spaced laterally of one another and define spaces 57,57 in the base frame 46 so that portions of the adjacent surface of the tool carriage 22 are exposed.

A knife frame 58 is carried by the base frame 46 for rotation relative to it about a vertical theta axis 59. The knife frame 58 also includes a guide 60 depending from the frame 58 below the lower horizontally extending wall for guiding the lower portion of a vertically elongated knife 62 and further includes a reciprocating mechanism 64 and a drive mechanism 66 connected to the upper end of the knife 62 for reciprocating it during a cutting operation. The drive mechanism 66 carries two bushings 71,71 positioned laterally relative to one another at the upper end of the drive mechanism 66 and has through openings 73,73 formed at its lower circular end, through which rods 70,70 are received. The rods 70,70 extend vertically in line with the openings 73,73 and the bushings 71,71 so as to be supported intermediate each end at two support points. At its lower end, each of the rods 70,70 extends through an opening formed in the guide 60 and is fixed to a pressure foot 68. A retaining clip 72 is fixed to each rod 70 at a point just above the guide 60 and cooperates with a compression spring 74 surrounding a portion of its rod between the bushing 71 and the clip 72. Therefore, when the base frame 46 is raised, the guide 60 engages the retaining clips 72,72 to raise the pressure foot above the surface of the sheet material 20 and as the base frame is lowered from its raised position the pressure foot 68 is brought into engagement with the material 20 before the base frame reaches its lowermost limit of travel, so that thereafter continued downward movement of the base frame causes the springs 74,74 to be compressed causing the pressure foot to exert a pressing force on the material 20.

A motor for driving the knife 62 in its reciprocating motion is indicated at 80. The motor 80 is fixed to the base frame 46 on the upper horizontal wall 52, and the drive mechanism 66 with the reciprocating mechanism 64 rotates with the knife 62 about the theta axis 59. The arrangement of the motor 80 and drive mechanism 66 allows the motor 80 to drive the reciprocating mechanism 64 while nevertheless permitting the knife frame with the reciprocating mechanism 64 and the guide 60 to rotate about the theta axis. For a more complete description of the connection between the reciprocating mechanism 64 and the drive motor 80, reference may be had to the aforementioned U.S. Pat. No. 4,841,822.

The knife frame 58 is mounted to the base frame 46 for rotation about the theta axis 59 by a main bearing unit 84 and is coupled to a gear wheel 88. The gear wheel 88 engages with a suitable gear train and a theta motor (not shown) to control the rotational positioning of the knife frame 58 and knife 62 about the theta axis 59. It should be understood that a conventional resolver associated with the theta motor provides a feedback signal to the controller 16, and during the cutting operation the controller controls the theta motor such as to maintain the knife tangent to the line of cut.

An actuator 90 for moving the base frame 46 between its raised and lowered positions includes a powered sliding rod 96, moveable between an extended position (shown in phantom line in FIG. 6) and a retracted position (shown in full line in FIG. 6), connected to the support carriage 22 at its upper end. A cutout 92 is formed in the support carriage 22 at this end and receives a generally L-shaped flange 94 extending from the base frame 46 upwardly and laterally through the cutout 92 connecting the base frame 46 for movement with the sliding rod 96 of the actuator 90. Preferably, and as illustrated, the actuator 90 is a pneumatic actuator and is aided in moving the base frame 46 upwardly by helical tension springs 98,98 each fixed at one of its ends to the support carriage 22 and at its other opposite end to the base frame 46.

Figure 4:
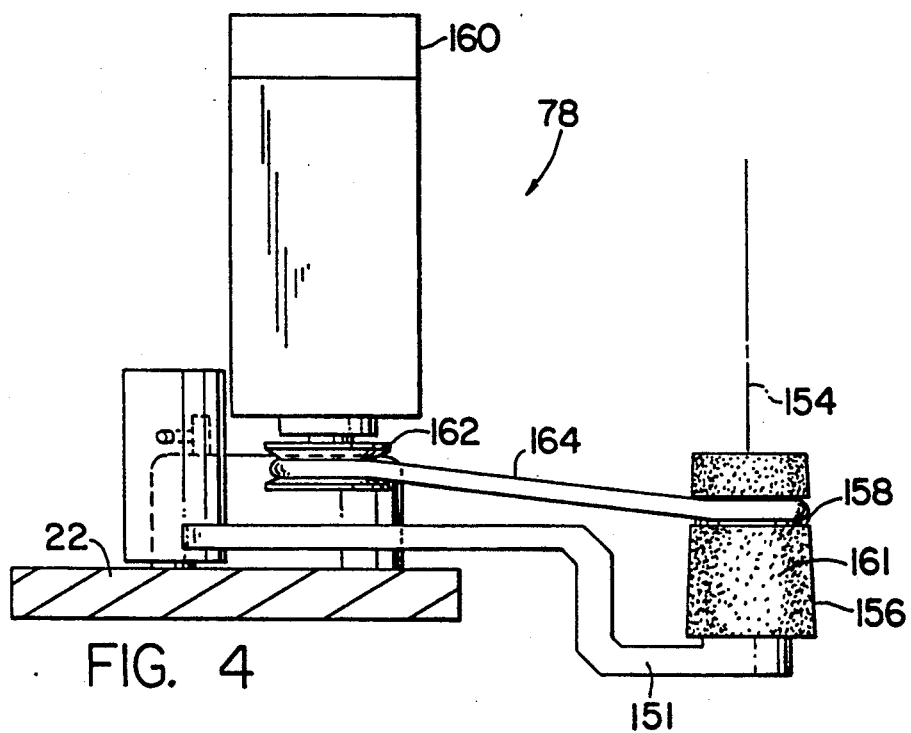
FIG. 4 illustrates in detail the sharpening device of the cutter head of FIGS. 1-3.

A sharpening mechanism, shown generally at 78 in FIG. 2 and in greater detail in FIG. 4, is carried by the support carriage 22 and includes a sharpening wheel 156 rotatably mounted on a support arm 151 pivotally mounted on the carriage 22. The sharpening wheel 156 consists of a body having a drive groove 158 intermediate its ends and an abrasive grit 161 bonded to its outer surface. The sharpening wheel is driven in rotation about a second vertical axis 154 by a drive motor 160 through a pulley 162 and an O-ring drive belt 164 engaging the wheel groove 158. The wheel 156 and support arm 151 are normally held in a retracted position against a stop by a tension spring (not shown) and the wheel 156 is preferably moved into engagement with the blade 62 by a rotary electric solenoid actuator 190 which drives the support arm. The body of the wheel 156 is slightly conical to accommodate the bending of the knife which occurs as the wheel is pressed against it and thereby causes the wheel to exert a substantially uniform sharpening effect on the knife along the length engaged by the wheel.

Figure 5:
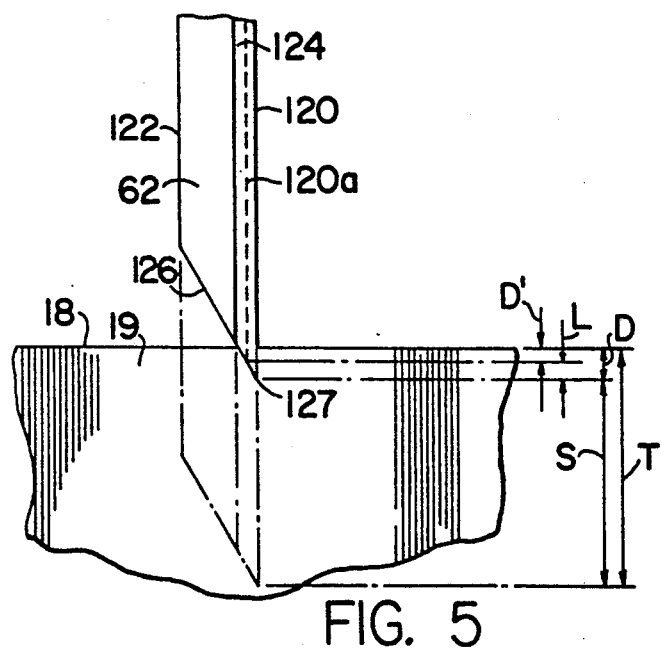
FIG. 5 is an illustration of the lower end portion of the knife of the cutter head of FIGS. 1-4.

As can be appreciated from FIG. 5, the knife 62 is essentially unsupported at its lower end below the guide 60, and is connected at its upper end to the reciprocating mechanism 64. The reciprocating mechanism 64 moves the upper end of the knife 62 through a vertical stroke, of approximately ⅜ of an inch in a typical case, represented by dimension S. As mentioned, it is desirable to maintain the lower tip of the knife 62 within the bed 19 so as to have approximately a minimum depth D at the top of each stroke of the knife. Preferably, the depth D may be about ⅛ inch so that the maximum penetration of the knife, which occurs at the bottom of each stroke, is approximately ½ inch, as represented by the dimension T.

The knife 62 is an elongated element made of metal, such as M-2 high speed steel, having a front leading edge 120 and a trailing rear edge 122 connected to one another by an inclined lower edge 126 which intersects the leading edge at the lower end or tip 127 of the knife. The inclined lower edge 126 enables the knife to more readily penetrate the bed 19. The leading edge 120 is primarily responsible for the cutting of the material 20 and is repeatedly sharpened by the sharpening mechanism 78 to maintain proper cutting capability. In particular, the portion 124 of the knife 62 extending rearwardly from the leading edge 120 is intermittently ground by the sharpening mechanism 78 to keep the edge 120 in a sharp condition. During the course of a sharpening cycle, the base frame 46 is first raised to its non-cutting position to bring the sharpened portion 124 of the blade 62 to the vertical level of the sharpening wheel 156. The knife is then rotated to a proper position about the theta axis 59 and the sharpening wheel is then rotated and brought into contact with one side of the sharpened portion 124 by operation of the actuator 190. During this, the blade is reciprocated so that the sharpening wheel contacts the full extent of the sharpened portion 124. The same process may then be repeated with respect to the other side of the sharpened portion 124.

As the sharpening wheel 156 grinds the sharpened portion 124 of the knife 62, the leading edge 120 recedes toward the trailing edge, as shown by phantom line 120a which represents the location of the leading edge after a large number of repeated sharpenings. Since the lower edge 126 of the knife 62 extends downwardly from the trailing edge 122 to the leading edge 120, as the leading edge 120 recedes rearwardly, the tip 127 moves upwardly, decreasing the minimum penetration depth D' of the knife into the bed 19. That is, as the forward edge moves from the full line position to the phantom line position of FIG. 5, a loss L of the knife tip penetration into the bed 19 occurs.

Figure 6:
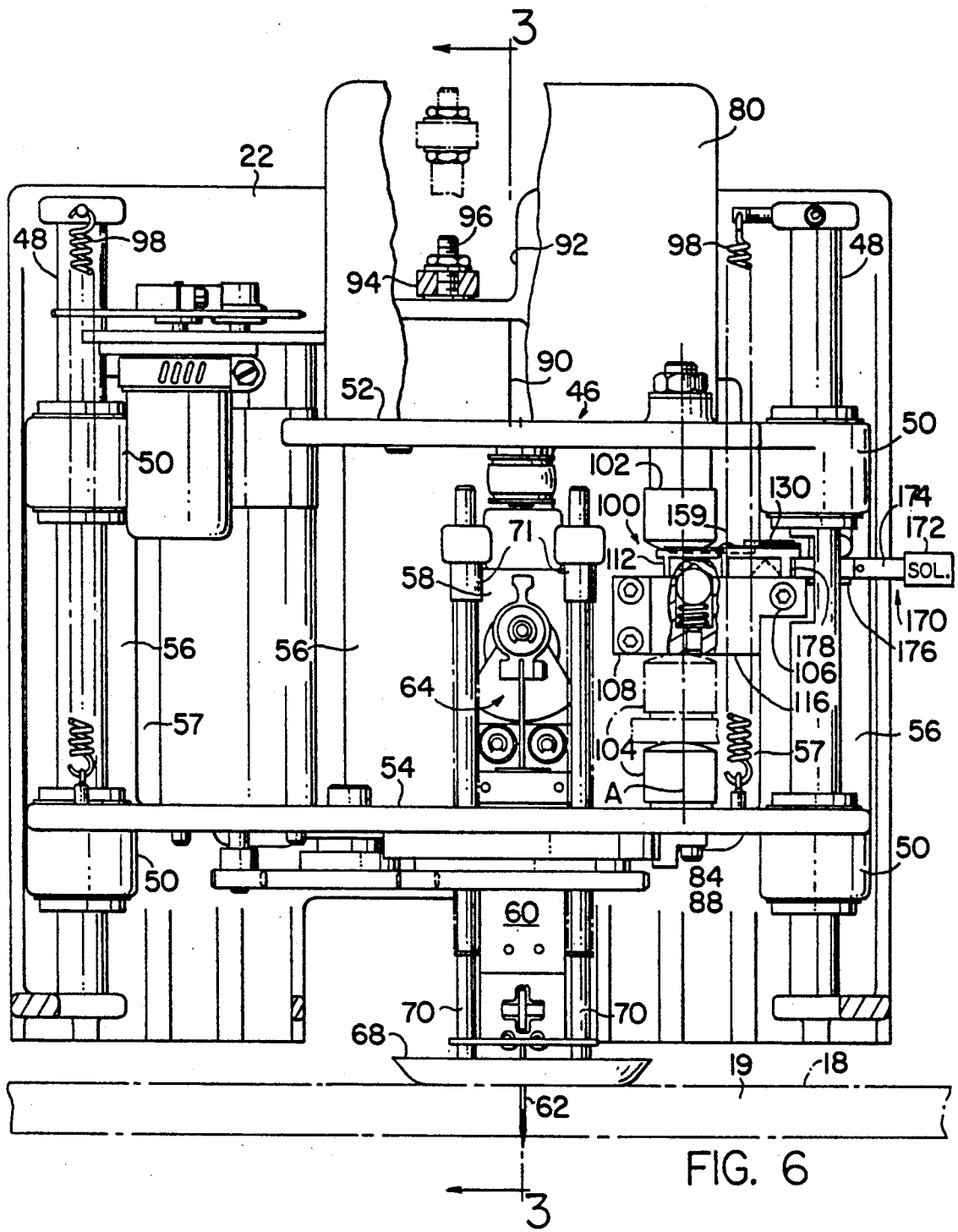
FIG. 6 is a front elevational view of the cutter head of FIGS. 1-4 showing in cutaway view the base frame actuator and the variable limit stop.
Figure 7:
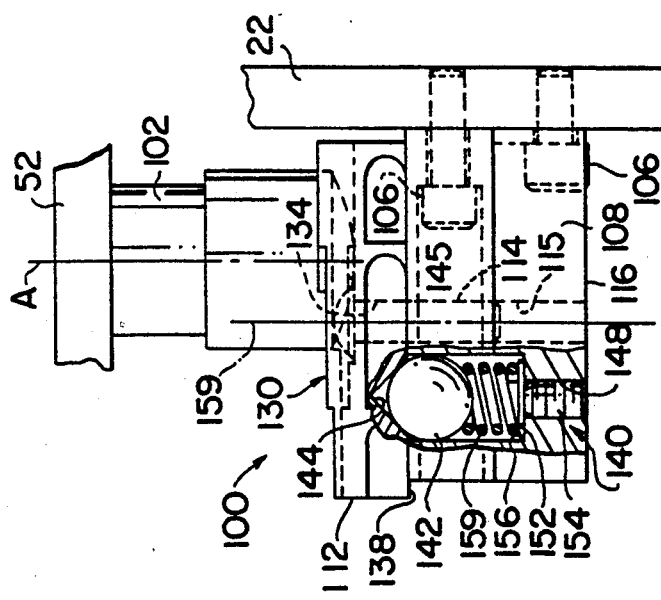
FIG. 7 is a side view partly in elevation and partly in section illustrating the detent mechanism associated with the limit stop member as seen from the right in FIG. 6.

In accordance with the invention, a variable limit stop, shown generally in FIGS. 6 and 7, is interposed between the base frame 46 and the support carriage 22 to limit the downward travel of the base frame and is adjustable to compensate for shortening of the knife by sharpening. To this end, the limit stop includes a stop mechanism 100 connected to the support carriage 22 and extending laterally through one of the spaces 57, 57 in the base frame 46 for cooperation with an upper bumper 102 fixed to and extending downwardly from the upper horizontal wall 52 of the base frame and a lower bumper 104 fixed to and extending upwardly from the lower horizontal wall 54 of the base frame. Upward movement of the base frame 46 relative to the support carriage 22 results in the lower bumper 104 eventually engaging the stop mechanism 100 to arrest such movement, while downward movement of the base frame causes the upper bumper to eventually engage the stop mechanism 100 to arrest such downward movement.

The stop mechanism 100 includes a generally rectangularly shaped body portion 108 having a downwardly facing bottom stop surface 116 for engagement with the lower bumper 104. Suitable securing means, such as screws 106, 106 threadably engaging with the carriage 22, rigidly fix the stop body 108 to the support carriage 22. Since it is not necessary to vary the height at which the base frame 46 is raised relative to the support surface 18, the bottom surface 116 of the body portion 108 operates to limit upward movement of the base frame 56 without variation in such limit.

A variable height stop element 112, rotatable about an axis 159 coincident with its own center C is connected to the body portion 108 by a center pin 114 fixed to the upper face of the body 108. The center pin 114 has an upper head and extends through an opening 134 in the stop element 112, and below the stop element is threaded into an opening 115 in the body 108. The stop element 112 has a lower face 138 bearing against the upper face of the body 108. It also has an upper face 130 circumferentially divided into six stop surfaces respectively labelled 132a-f and occupying different vertical levels. By way of example, adjacent ones of the surfaces 132a-f may differ in height by about 1/16 of an inch to yield a height differential H between the first or highest step 132a and the last or lowest step 132f equalling about ⅜ of an inch. The stop element 112, for example, may measure approximately one and a one half inches across, as illustrated by the dimension W, with the surfaces 132a-f dividing the face 130 into 60 degree units, so that each one of the surfaces 132a-f provides a sufficient area for the upper bumper 102 to abut against when that surface is vertically aligned with the bumper 102 and when the base frame 46 is moved to the lowered position illustrated in FIG. 6.

The stop mechanism 100 also includes a means for releasably holding the stop element with a selected one of the surfaces 132a-f in alignment with the line of travel A of the bumper 102. This means comprises a detent mechanism, indicated generally at 140 in FIGS. 6 and 7 having a ball element 142 moveable relative to and received within a first bore 145 extending partially through the body 108. A second bore 148 in the body 108 communicates with the first bore 145 and is of smaller diameter than the bore 145 so as to be separated therefrom by a shoulder 152. The second bore 148 threadably receives a set screw 154 cooperating with a thrust washer 156 adjacent the shoulder 152. Interposed between the ball element 142 and the thrust washer 156 is a helical compression spring 158 biasing the ball element 142 upwardly toward the stop element 112.

Figure 10:
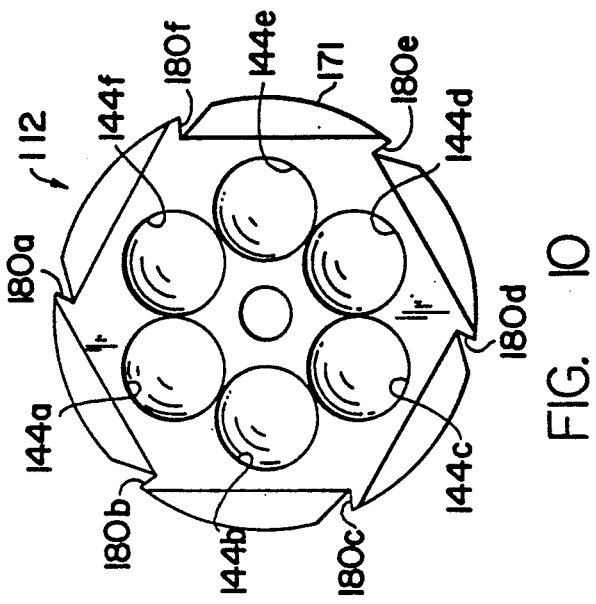
FIG. 10 is a bottom view of the limit stop member.
Figure 8:
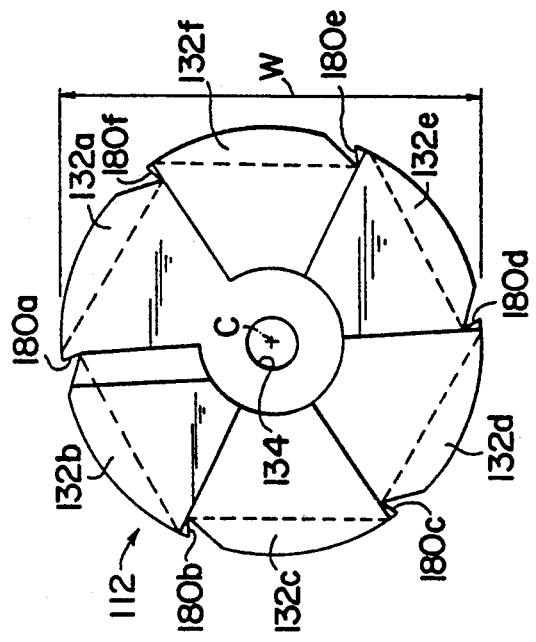
FIG. 8 is a top view of the limit stop member.
Figure 9:
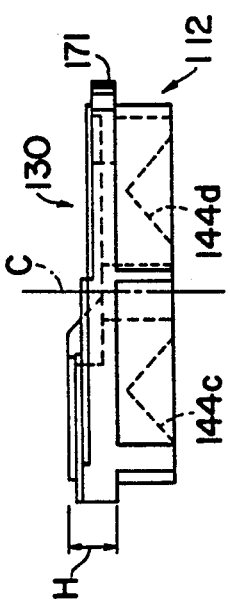
FIG. 9 is a side elevational view of the limit stop member.

As is best shown in FIGS. 9 and 10, the lower surface 138 of the stop element 112 has six conical recesses 144a-f formed in it at 60° intervals. Each of the recesses 144a-f corresponds to a respective one of the stop surfaces 132a-f so that when the ball element 142 is in one recess its corresponding stop surface is aligned with the path A of the bumper 102.

To controllably rotate the stop element 112 between different angular orientations, an indexing device, shown generally at 170 in FIG. 6, cooperates with the stop element 112. It comprises a solenoid actuator 172 fixed to the carriage 22 adjacent the body portion 108, with a pusher arm 174 being secured to the actuator 172 at one of its ends for movement by the actuator between extended and retracted positions. The pusher arm is stiff in compression yet somewhat laterally flexible. It is supported for sliding movement generally along its length and relative to the support carriage 22 by a guide 176 mounted on the support carriage 22. The free end of the pusher arm 174 is tapered at 178 to create a knife edge for cooperation with six inwardly directed indentations 180a-f spaced 60° from one another formed in the rim 171 of the stop element 112. Each of the indentations 180a-f corresponds respectively to an associated one of the stop surfaces 132a-f and is located at point on the rim 171 such that when the detent mechanism 140 holds the element 112 at one of its six selectable angular orientations, the line of travel of the pusher arm 174 extends into that indentation. Therefore, when the pusher arm 174 is moved to its extended position by the actuator 172, the knife edge 178 moves into the indentation and by engagement with its wall facing the knife edge indexes the element 112 clockwise until the next succeeding one of the recesses 144a-f becomes aligned with and engaged by the ball 142.

Indexing of the stop element 112 is accomplished against the bias of the spring 158 acting on the ball 142 and the related camming action of the ball 142 on the surfaces of the recesses. Rotation of the set screw 154 adjusts the force exerted by the spring 159 on the ball 142 allowing such force to be set so that the force of the actuator 172 is enough to drive the ball 142 downwardly out of the involved one of the recesses while nevertheless providing enough of an upward bias to have the ball securely hold the stop element in the selected position.

The master controller 16 counts the number of sharpenings of the knife and commands an indexing of the element 112 each time the number of sharpenings since the last indexing reaches a given value known from experience to be approximately equal to a loss of about 1/16" in knife length.

While the present invention has been described in the preferred embodiment, it should be understood that numerous modifications and substitutions can be had without departing from the spirit of the invention. For example, the stop element 112 may be replaced by one having more or less than six stop faces, and the stop element used may be supported and moved in different ways than the stop element 112, the important consideration being that by movement of the stop element at a selected time, a stop surface of one height is replaced by one of a different height better suiting the length of the knife. Moreover, although the illustrated stop element is one having a number of stop surfaces of discretely different levels, it is possible, in keeping with the invention, to use instead a stop element having a single sloped stop surface gradually decreasing in height. Accordingly, the present invention has been described by way of illustration rather than limitation.

I claim:

1. A cutting machine for cutting sheet material, said machine comprising:
    a knife penetrable bed having an upwardly facing support surface for supporting sheet material to be cut,
    a cutter head with a reciprocating cutting knife,
    means for supporting said cutter head above said support surface with said knife extending downwardly from said cutter head to a lower end and for moving said cutter head vertically relative to said support surface between a lowered cutting position and a raised non-cutting position,
    means for moving said cutter and said bed relative to one another while said cutter head is in said lowered position to cut sheet material supported on said support surface with said lower end of said knife penetrating said bed,
    means for periodically sharpening said knife, as a result of which sharpening said knife becomes gradually shortened in length with said lower end thereof moving upwardly relative to the cutter head, and
    means for defining said lowered position of said cutter head relative to said support surface and which means having means for providing an abutment surface having a given height taken relative to said support means and an associated engaging member moved into contact with each other to positively stop said cutter head in said lowered position and being adjustable to provide another abutment surface of a height different from that of the one abutment surface, the heights of the one and the another abutment surfaces differing by an amount related to the length by which the knife at its lower end becomes shortened due to sharpening occurring in a given period to vary said lowered position in accordance with said shortening of said knife to maintain said lower end of said knife, in said lowered position of said cutter head, at approximately a given vertical relationship with said bed despite said shortening due to sharpening.

2. In a cutting machine of the type having a cutter head with a reciprocating knife for cutting pattern pieces from a ply or superimposed plies of limp sheet material supported on a knife penetrable bed with said cutter including a base frame moveable relative to a support carriage between a raised non-cutting position wherein the knife is out of engagement with the bed and a lowered cutting position in which said knife at its tip is maintained within said permeable bed, the improvement comprising:
    variable limit stop means interposed between a said carriage and said base frame for controllably varying the downward limit of travel of the base frame;
    control means for commanding said variable limit stop means to define a next lower limit of travel of said base frame;
    said cutter head including a sharpening mechanism; and
    said control means includes a controller which counts the number of sharpenings of said knife and commands said variable limit stop means to redefine said next lower limit of travel of said base frame when the number of sharpenings reaches a given value.

3. A cutting machine for cutting sheet material, said machine comprising:
a support;
a base frame carrying a cutter head with a knife and which base frame is movable vertically of said support between a raised and a lowered position;
a bed penetrable by said knife and located below said base frame for supporting material to be cut by said knife; and
means for defining the lowered position of said base frame relative to said support, said means having means for providing a surface and an associated engagement member moved into contact with each other to positively stop said cutter head in said lowered position and being adjustable to vary the lowered position of said base frame relative to said support;
said means for limiting the lowered position of said base frame includes a variable limit stop mechanism carried by one of said base frame and said support and a first engagement member carried by the other of said base frame and said support;
said stop mechanism having said surface facing said first engagement member;
said surface having at least two portions of different height relative to said support or base frame which carries it;
either of which surface portion may be moved into position for engagement by said first engagement member to define said lowered position of said base frame relative to said support; and
wherein the heights of each of said at least two portions of said surface differ from the other by an amount related to the length by which the knife at its lower end becomes shortened due to sharpening occurring in a given period.

4. A cutting machine as defined in claim 3 further characterized in that said cutting machine includes a second engagement member carried by one of said base frame and said support; and
wherein said second engagement member engages with a fixed stop surface carried by the other of said base frame and said support to define said raised position of said base frame relative to said support.

5. A cutting machine as defined in claim 4 further characterized in that said variable limit stop mechanism includes a body portion defining said fixed stop surface engaging with said second engagement member.

6. A cutting machine as defined in claim 3 further characterized in that said variable limit stop mechanism includes a body portion and a stop element rotatably supported on said body portion, said stop element having an upper face and an opposite lower face;
said stop element upper face defines said surface with said at least two portions of different heights; and
wherein said stop element lower face bears against said body portion.

7. A cutting machine as defined in claim 6 wherein said stop element has a series of circumferentially spaced apart conical recesses each corresponding in position to a respective one of said portions of said stop element of different heights; and
wherein said variable limit stop mechanism further includes detent means cooperating with an involved one of said recesses to releasably hold said stop element against rotation.

8. A cutting machine as defined in claim 7 further characterized in that said variable limit stop mechanism further includes indexing means cooperating with said detent means for selectively indexing said stop element to rotatably vary the orientation of said stop element to selectively position one of said two portions of different heights in alignment with said first engagement member.

9. A cutting machine as defined in claim 8 further characterized by a knife sharpening means for periodically sharpening said knife; and
control means for commanding said indexing means to index said stop element when said knife has been sharpened a given number of times since the last indexing of said stop element.

10. A cutting machine as defined in claim 5 further characterized in that said base frame is a generally U-shaped member having an upper horizontal wall and a lower horizontal wall connected with one another by vertically extending wall sections;
said vertical wall sections being laterally separated from one another to define spaces in said base frame; and
said variable limit stop mechanism being connected to said support such that it extends laterally of said support and through one of said spaces in said base frame and is positioned in line with said first and second engagement members;
said first engagement member being a first bumper extending downwardly from said upper horizontal wall and said second engagement member being a second bumper extending upwardly from said lower horizontal wall; and
wherein said variable limit stop mechanism is positioned in line between said first and said second bumpers such that one of said at least two portions of said variable limit stop mechanism surface is selectively positionable in line with said first bumper and said body portion fixed stop surface is positioned in line with said second bumper.

11. A cutting machine having a cutter head with a reciprocating knife for cutting pattern pieces from a sheet or superimposed sheets of limp material supported on an underlying knife penetrable support surface, said cutting machine comprising:
means providing a knife penetrable support surface for supporting sheet material to be cut;
a carriage supported for movement above said support surface in a plane parallel to said support surface;
a base frame carried by said carriage for movement vertically relative to said carriage between a raised position and a lowered position;
said base frame having an upper horizontal wall and a lower horizontal wall;
a first bumper extending downwardly from said upper wall and a second bumper vertically aligned with said first bumper and extending upwardly from said lower wall;
a variable limit stop mechanism connected to said carriage and located between said upper and lower walls of said base frame in line with said first and second bumpers;
said variable limit stop mechanism having a bottom stop surface facing said second bumper for limiting the upward movement of said base frame to define said raised position and having a rotatable stop element having a surface oriented toward said first bumper with at least two portions of different heights;

said rotatable stop element being selectively positionable relative to said carriage to vary the orientations of said at least two portions of said stop element surface to selectively position one of said portions in line with said first bumper to variably define the lowered position of said base frame by providing different abutment surfaces which selectively engage said first bumper to positively stop said base frame at different heights relative to said carriage; and wherein the heights of each of said at least two portions of said stop element surface differ from the other by an amount related to the length by which the knife at its lower end becomes shortened due to sharpening occurring in a given period.

12. A cutting machine as defined in claim 11 further characterized in that said variable limit stop mechanism includes a body portion fixed to said carriage;

a first opening formed in said body and opening toward said stop element and communicating with a second opening in said body of a smaller diameter than said first opening and creating an annularly extending shoulder therewith;

a ball received within said first opening;

a spring interposed between said ball and said shoulder to urge said ball against said stop element;

said second opening being threaded along its length and receiving a correspondingly threaded set screw cooperating with said spring to adjust the biasing force exerted by the spring on the ball; and actuator means cooperating with said stop element to index it at different angular orientations relative to said body portion.

13. A cutting machine as defined in claim 12 further characterized in that said cutter head includes sharpening means for sharpening said knife and wherein a control means is connected to said actuator means and instructs said actuator means to index said stop element in response to said control means counting the number of knife sharpenings.

14. In a cutting machine of the type having a cutter head with a reciprocating knife for cutting pattern pieces from a ply or superimposed plies of limp sheet material supported on a knife penetrable bed with said cutter including a base frame moveable relative to a support carriage between a raised non-cutting position wherein the knife is out of engagement with the bed and a lowered cutting position in which said knife at its tip is maintained within said permeable bed, the improvement comprising:

variable limit stop means interposed between said carriage and said base frame for controllably varying the downward limit of travel of the base frame; and control means for commanding said variable limit stop means to define a next lower limit of travel of said base frame; and wherein the next lower limit of travel of said base frame being related to the length by which the knife at its lower end becomes shortened due to sharpening.

15. The combination as defined in claim 14 further characterized in that said cutter head includes a sharpening mechanism; and said control means includes a controller which counts the number of sharpenings of said knife and commands said variable limit stop means to redefine said next lower limit of travel of said base frame when the number of sharpenings reaches a given value.

16. A cutting machine for cutting sheet material, said machine comprising:

a support;

a base frame carrying a cutter head with a knife and which base frame is movable vertically of said support between a raised and a lowered position;

a bed penetrable by said knife and located below said base frame for supporting material to be cut by said knife;

means for defining the lowered position of said base frame relative to said support, said means being adjustable to vary the lowered position of said base frame relative to said support;

said means for limiting the lowered position of said base frame includes a variable limit stop mechanism carried by one of said base frame and said support and a first engagement member carried by the other of said base frame and said support;

said stop mechanism having a surface facing said first engagement member;

said surface having at least two portions of different height relative to said support or base frame which carries it;

either of which surface portion may be moved into position for engagement by said first engagement member to define said lowered position of said base frame relative to said support;

said variable limit stop mechanism includes a body portion and a stop element rotatably supported on said body portion, said stop element having an upper face and an opposite lower face;

said stop element upper face defines said surface with said at least two portions of different heights and said stop element lower face bears against said body portion;

said stop element has a series of circumferential spaced apart conical recesses each corresponding in position to a respective one of said portions of said stop element of different heights;

said variable limit stop mechanism further includes detent means cooperating with an involved one of said recesses to releasably hold said stop element against rotation;

said variable limit stop mechanism further includes indexing means cooperating with said detent means for selectively indexing said stop element to rotatably vary the orientation of said stop element to selectively position one of said two portions of different heights in alignment with said first engagement member;

a knife sharpening means for periodically sharpening said knife; and control means for commanding said indexing means to index said stop element when said knife has been sharpened a given number of times since the last indexing of said stop element.

17. A cutting machine having a cutter head with a reciprocating knife for cutting pattern pieces from a sheet or superimposed sheets of limp material supported on an underlying knife penetrable support surface, said cutting machine comprising:

means providing a knife penetrable support surface for supporting sheet material to be cut;

a carriage supported for movement above said support surface in a plane parallel to said support surface;

a base frame carried by said carriage for movement vertically relative to said carriage between a raised position and a lowered position;

said base frame having an upper horizontal wall and a lower horizontal wall;

a first bumper extending downwardly from said upper wall and a second bumper vertically aligned with said first bumper and extending upwardly from said lower wall;

a variable limit stop mechanism connected to said carriage and located between said upper and lower walls of said base frame in line with said first and second bumpers;

said variable limit stop mechanism having a bottom stop surface facing said second bumper for limiting the upward movement of said base frame to define said raised position and having a rotatable stop element having a surface oriented toward said first bumper with at least two portions of different heights;

said rotatable stop element being selectively positionable relative to said carriage to vary the orientations of said at least two portions of said stop element surface to selectively position one of said portions in line with said first bumper to variably define the lowered position of said base frame;

said variable limit stop mechanism includes a body portion fixed to said carriage;

a first opening formed in said body and opening toward said stop element and communicating with a second opening in said body of a smaller diameter than said first opening and creating an angularly extending shoulder therewith;

a ball received within said first opening;

a spring interposed between said ball and said shoulder to urge said ball against said stop element;

said second opening being threaded along its length and receiving a correspondingly threaded set screw cooperating with said spring to adjust the biasing force exerted by the spring on the ball;

actuator means cooperating with said stop element to index it at different angular orientations relative to said body portion; and wherein said cutter head includes sharpening means for sharpening said knife and wherein a control means is connected to said actuator means and instructs said actuator means to index said stop element in response to said control means counting the number of knife sharpenings.

* * * * *